United States Patent [19]

Ronzio et al.

[11] 4,079,116
[45] Mar. 14, 1978

[54] PROCESS FOR PRODUCING AMMONIUM HEPTAMOLYBDATE AND/OR AMMONIUM DIMOLYBDATE

[75] Inventors: Richard A. Ronzio, Golden; Phillip K. Davis, Arvada; Robert C. Ziegler, Lakewood, all of Colo.

[73] Assignee: AMAX Inc., New York, N.Y.

[21] Appl. No.: 754,593

[22] Filed: Dec. 27, 1976

[51] Int. Cl.$^2$ ............................................. C01G 39/00
[52] U.S. Cl. ........................................ 423/56; 423/54; 423/58; 423/593; 23/297; 23/302 A
[58] Field of Search .............. 423/53, 56, 58, 54, 423/61, 593; 23/296, 297, 302 A, 299, 305 R

[56] References Cited

U.S. PATENT DOCUMENTS

| | | | |
|---|---|---|---|
| 1,838,767 | 12/1931 | Iredell | 423/56 |
| 3,357,821 | 12/1967 | Henrickson | 423/58 |
| 3,829,550 | 8/1974 | Ronzio et al. | 423/55 |
| 3,848,049 | 11/1974 | Ronzio et al. | 423/56 |
| 3,932,580 | 1/1976 | Vertes et al. | 423/56 |
| 3,957,946 | 5/1976 | Ronzio et al. | 423/54 |
| 3,963,823 | 6/1976 | Kulkarni | 423/56 |

*Primary Examiner*—Herbert T. Carter
*Attorney, Agent, or Firm*—Harness, Dickey & Pierce

[57] ABSTRACT

A process for producing a high purity ammonium heptamolybdate and/or ammonium dimolybdate product by which a particulated molybdenum oxide concentrate is purified to remove contaminating metal cations, whereafter it is leached with an ammoniacal leach solution to extract the molybdenum trioxide constituent therein as soluble ammonium molybdate compounds. The resultant ammoniacal leach solution is thereafter concentrated at an elevated temperature, whereafter at least a portion thereof is adjusted to provide an ammonia-to-molybdenum trioxide mol ratio ranging from about 0.86:1 to about 1.25:1, and the adjusted solution thereafter is cooled to effect a precipitation of ammonium heptamolybdate crystals which are separated and recovered, and the balance of the cooled solution is recirculated for admixture with additional ammoniacal leach solution. A portion of the concentrated ammoniacal leach solution can be further concentrated by evaporation to effect crystallization of ammonium dimolybdate which is separated and recovered.

9 Claims, 2 Drawing Figures

PROCESS FOR PRODUCING AMMONIUM HEPTAMOLYBDATE AND/OR AMMONIUM DIMOLYBDATE

BACKGROUND OF THE INVENTION

Ammonium heptamolybdate [$(NH_4)_6Mo_7O_{24} \cdot 4H_2O$] sometimes also referred to as ammonium paramolybdate, comprises a valuable source of molybdate ions and is in extensive use as an analytical reagent, is employed for synthesizing molybdenum-containing pigments and catalysts for various liquid and gas phase hydrogenation and desulfurization reactions in petroleum refining operations and coal technology, as well as for the production of a relatively pure grade of molybdenum metal.

A relatively high purity ammonium heptamolybdate or AHM product has heretofore been produced on a commercial scale by dissolving a high purity molybdenum trioxide in ammonium hydroxide to produce a saturated solution having a pH of about 6 to about 6.6, which thereafter is cooled from its saturation temperature of about 55° C to temperatures as low as about 20° C or lower. During the cooling cycle, a precipitation of AHM crystals occurs which are removed such as by centrifugation. The balance of the solution is employed for forming a fresh solution by the addition of further molybdenum trioxide and ammonia to provide the proper pH at 55° C, whereafter the cooling step is again repeated. While the foregoing prior art process is eminently satisfactory for producing an ammonium heptamolybdate product of the requisite purity, certain economic disadvantages are inherent due to the necessity of employing high purity starting materials, such as molybdenum trioxide derived from sublimation or from the calcination of ammonium dimolybdate (ADM) derived from the evaporative crystallization of ammoniacal solutions containing molybdate ions.

The present invention overcomes many of the disadvantages associated with prior art techniques for forming high purity ammonium heptamolybdate as well as ammonium dimolybdate by directly utilizing impure molybdenum oxide concentrates as a starting material, achieving substantial cost savings over techniques heretofore known.

SUMMARY OF THE INVENTION

The benefits and advantages of the present invention are achieved by a process in which an impure particulated molybdenum oxide concentrate, such as derived from an air roasting of the molybdenite concentrate, is first treated with a hot aqueous leach solution in order to solubilize and extract a substantial portion of the contaminating metal cations present therein. The aqueous leach solution is separated from the leached concentrate, such as by filtration, and preferably is further processed to recover the solubilized molybdate ions therein which are recirculated for further processing. The aqueous leached concentrate thereafter is contacted with an ammoniacal leach solution to form a slurry of a concentration ranging from about 20 to about 50% solids containing an excess of ammonia. The ammoniacal leaching step is continued until substantially all of the molybdenum trioxide constituent therein is converted to soluble ammonium molybdate compounds.

The ammoniacal leach solution thereafter is separated from the remaining insoluble residue which is discarded and the leach solution is transferred to a concentrator and is heated to effect an evaporation of the water constituent therein to a point approaching the saturation of the dissolved ammonium molybdate compounds therein. In accordance with one embodiment of the process, at least a portion of the concentrated solution is withdrawn and the molar ratio of ammonia to molybdenum trioxide is adjusted by acidification or ion exchange to a range within about 0.86:1 to about 1.25:1 at an elevated temperature whereafter the adjusted solution is cooled to a temperature of about 20° C or lower to effect a precipitation of ammonium heptamolybate crystals. The AHM crystals are separated from the residual solution, such as by filtration or centrifugation, and the residual solution is recycled for admixture with additional ammoniacal leach solution which is reconcentrated in the concentrator and again subjected to adjustments followed by a cooling precipitation cycle. By employing an evaporative crystallizer as a concentrator, a controlled portion of the dissolved ammonium molybdate compounds can be recovered in the form of ammonium dimolybdate.

In accordance with an alternative embodiment of the process, a vacuum evaporator can be employed as the concentrator whereby a controlled adjustment in the molar ratio of ammonia and molybdenum trioxide is effected obviating the need for pH adjustment by acidification.

The process can be operated as a closed system to which an impure molybdenum trioxide concentrate is fed in addition to make up ammonia and from which a high purity ammonium heptamolybdate product, together with ammonium dimolybdate product, is recovered along with waste side streams comprising the extracted contaminating metal cations and the insoluble residue remaining at the completion of the ammoniacal leaching step. In accordance with a preferred embodiment of the present invention, carbon dioxide is employed for effecting a pH adjustment of the solution prior to cooling crystallization to provide the requisite mol ratio of ammonia to molybdenum trioxide which subsequently is removed during reheating of the residual solution in the concentrator.

Additional advantages and benefits of the present invention will become apparent upon a reading of the description of the preferred embodiments taken in conjunction with the accompanying drawing.

DESCRIPTION OF THE PREFERRED EMBODIMENTS

Figure 1:
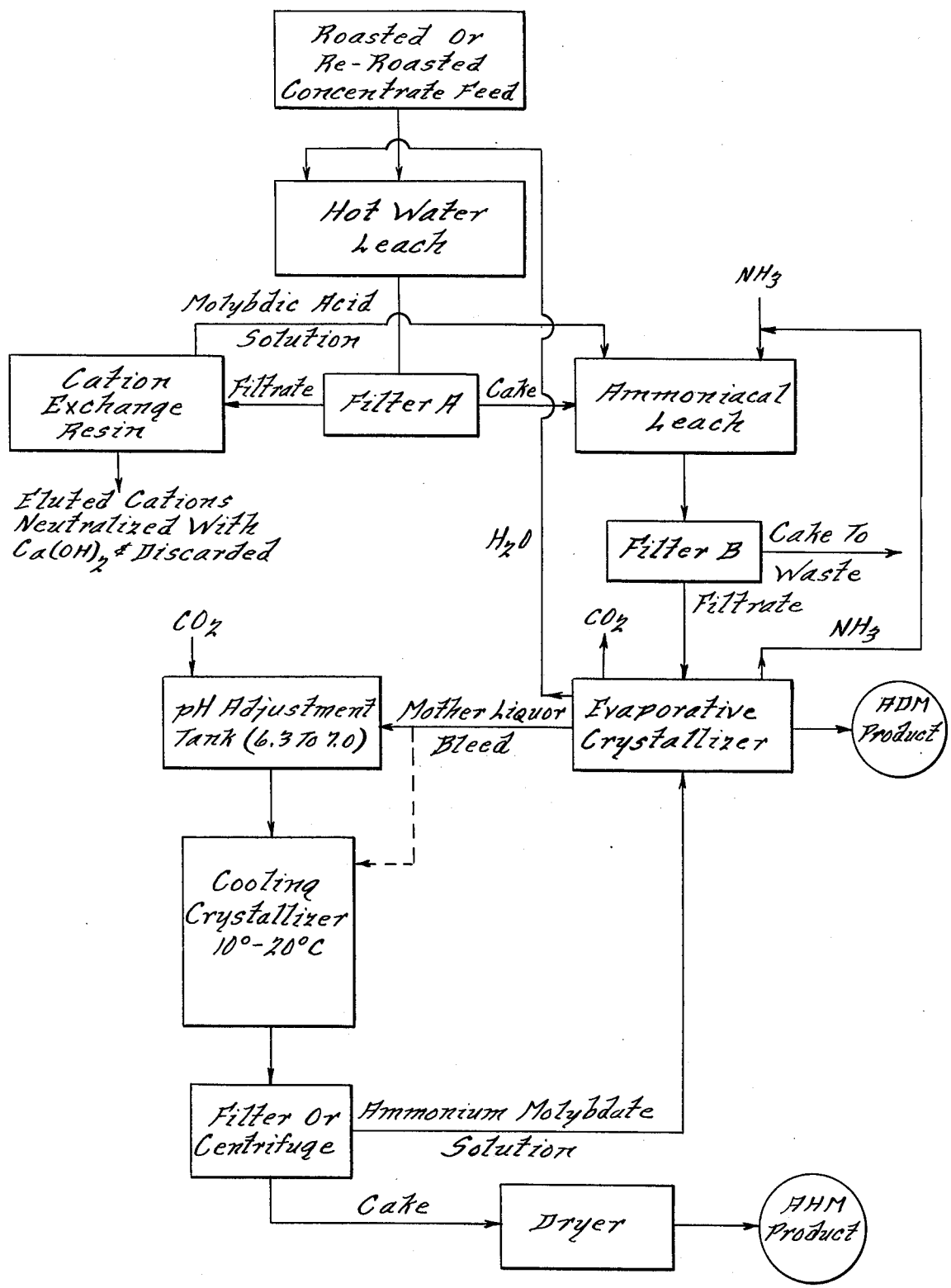
FIG. 1 comprises a schematic flow diagram of one embodiment of the process for producing a high purity ammonium heptamolybdate or ammonium dimolybdate product.
Figure 2:
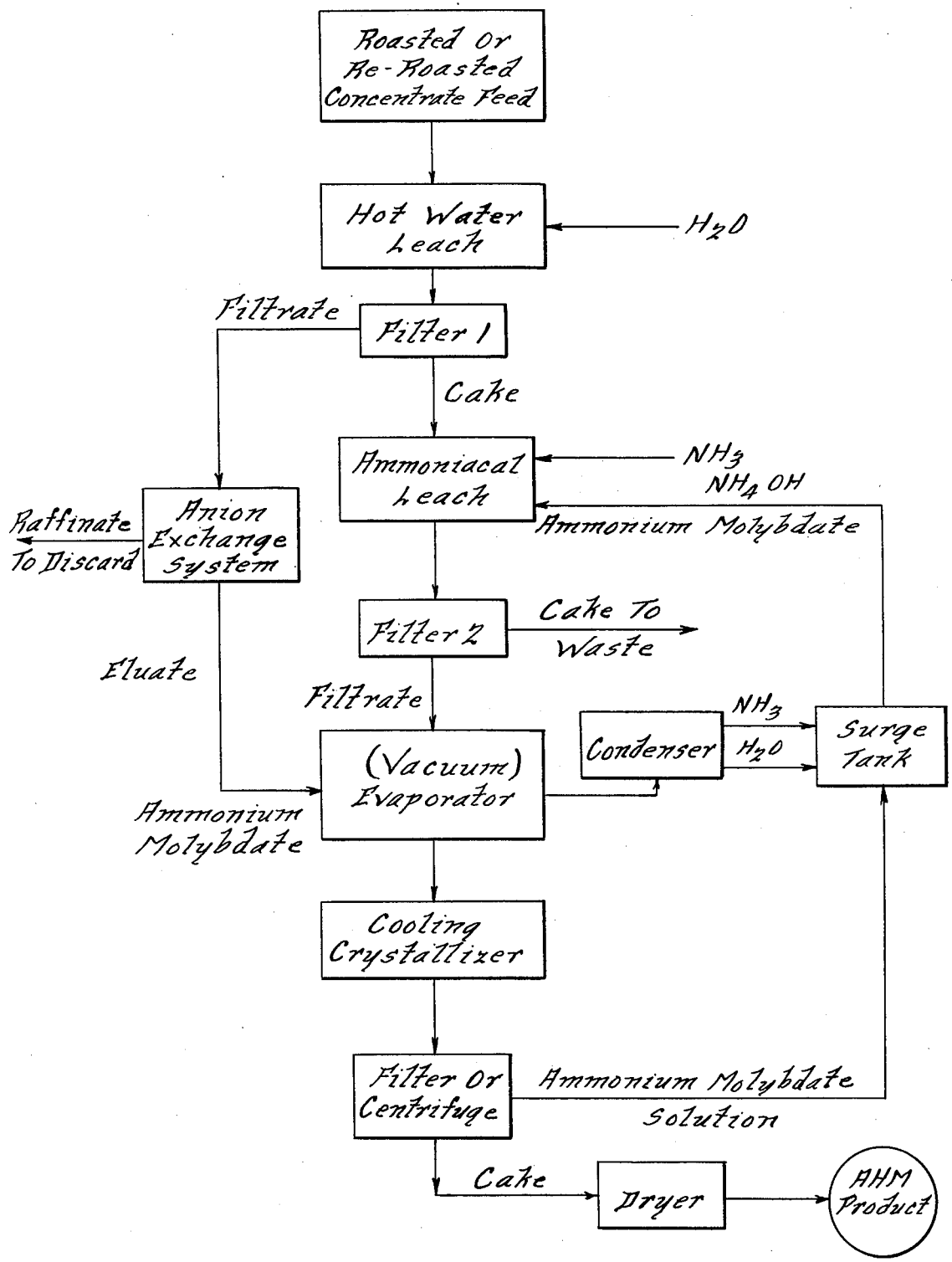
FIG. 2 of the drawings comprises a schematic flow diagram of an alternative embodiment of the process in which a high purity ammonium heptamolybdate product is produced from an impure roasted molybdenum oxide concentrate feed material.

The feed material to the process in accordance with the flow diagrams shown in FIGS. 1 and 2 of the drawings comprises a particulated impure or technical grade concentrate consisting predominantly of molybdenum oxide and further containing various contaminating metal constituents and compounds thereof in percentages varying in accordance with the particular characteristics of the original ore body and the manner by which the concentrate was produced. Most commonly, technical grade molybdenum oxide concentrates are produced from an air roasting of molybdenite ($MoS_2$) concentrates produced such as by an oil flotation extraction beneficiation process, whereby the gangue constituents are reduced to a level less than about 40% and preferably less than about 10% by weight. The oil flotation beneficiation process is normally carried out in a series of successive cycles, each including a grinding step followed by a flotation step, in which the particle size of an ore comprised of a highly silicified and altered granite in which the molybdenite is distributed in the form of very fine-sized veinlets at a concentration usually ranging from about 0.3 to about 0.6% as mined is progressively reduced to a particle size usually 35% + 100 mesh and the particles composed principally of molybdenite are separated from the silicious gangue materials employing hydrocarbon oils in combination with various wetting agents.

The molybdenite concentrate thus produced is transferred to a roasting operation employing temperatures generally ranging from about 550° to about 700° C in the presence of excess air to effect an oxidation of the predominant portion of molybdenite to molybdenum oxide. Roasting apparatuses commonly used for this purpose include a variety of well known multiple-hearth furnaces such as, for example, Herreshoff, McDougall, Wedge, Nichols, etc., comprising a plurality of annular-shaped hearths disposed in vertically spaced relationship on which the molybdenite concentrate is transferred in a cascading fashion downwardly from the uppermost hearth while exposed to a countercurrent flow of hot flue gases to effect an oxidation thereof. While the specific concentration of the molybdenum oxide constituent in the feed material is not critical, technical grade concentrates containing at least about 80% and preferably at least about 90% molybdenum oxide are preferred.

The resultant roasted concentrate or technical grade oxide feed material, is usually of an average particle size less than about 100 mesh and any agglomerates produced during the air roasting operation can be removed by a supplemental grinding operation. Particle sizes less than about 100 mesh are preferred in accordance with the practice of the present invention in view of the greater surface area of the feed material, facilitating a leaching of the feed and correspondingly reducing the residence time required in the various leaching steps.

In accordance with a preferred practice of the present invention, the conventional air roasted technical grade concentrate is subjected to a supplemental reroasting operation in the presence of an oxygen-enriched atmosphere of substantially atmospheric pressure and at a temperature of from about 550° to about 650° C for a period of time sufficient to convert substantially all of the sub-oxides of lower oxides of molybdenum to molybdenum trioxide and to further convert the contaminating metals and metal molybdite compounds present to corresponding metal oxides and metal molybdate compounds which are of increased solubility and can more readily be removed by the subsequent hot aqueous leaching step.

The reroasting step is carried out in oxygen-enriched atmospheres containing upwards of 40% oxygen, and preferably atmospheres containing substantially 100% oxygen. A further description of the specific details and benefits derived from the oxygen-enriched reroasting step is provided in United States patent application Ser. No. 535,671, filed Dec. 23, 1974, for "Molybdenum Oxide Purification Process", now U.S. Pat. No. 3,957,946, the substance of which is incorporated herein by reference. The further oxidation of contaminating metal compounds, such as compounds of potassium, copper, calcium, magnesium, iron, aluminum, lead, zinc, bismuth, or the like, renders them more susceptible to extraction by water leaching, providing for increased processing efficiency and providing a product of increased purity.

In accordance with the flow diagram as shown in FIG. 1, the technical grade molybdenum oxide concentrate is first subjected to a hot water leach treatment in which the particulated feed material is pulped with water at a temperature generally ranging from about 70 up to about 95° C, and preferably around 80° C, at a solids concentration ranging from about 5 up to about 50% by weight, but below that at which difficulty is encountered in achieving good agitation and pumping of the pulped mass. Particularly satisfactory results are obtained employing solids concentrations of from about 20 to about 50% and temperatures of about 80° C at which retention times of about 1 hour provide for a substantially complete extraction of the contaminating metals including contaminating metal molybdates along with some of the original molybdenum trioxide present. The resultant slurry is thereafter transferred from the hot aqueous leaching tank to a filter A and the filtrate containing the dissolved contaminating metal cations is transferred to a cation exchange resin column, while the cake is transferred to an ammoniacal leaching tank.

The filtrate from filter A is acidic, usually having a pH of from about 2 to about 3 due to the presence of molybdic acid and is passed in contact with a suitable cation exchange resin, whereby the contaminating metal cations are selectively adsorbed and the effluent consisting predominantly of molybdic acid is returned to the ammoniacal leaching tank and is combined with the filter cake from filter A. Cation exchange resins suitable for this purpose include Amerlite IR 120, which is a sulfonic type cation exchange resin available from Rohm & Haas. Alternative satisfactory cation exchange resins which are effective in adsorbing contaminating metals such as potassium, copper, calcium, magnesium, iron, etc., in an acid environment can also be employed. The cation exchange resin is preconditioned employing an acid such as sulfuric acid to effect conversion thereof to the hydrogen form, and after loading, the cations adsorbed thereon are stripped with an acid such as sulfuric acid or hydrochloric acid at concentrations of about 5 to about 10% acid. The eluate from the cation exchange resin containing the contaminating cations is transferred to an appropriate waste treatment process prior to discharge to waste.

In addition to the use of a cation exchange resin column as depicted in FIG. 1, it is also contemplated that alternative techniques can be employed to effect a substantially complete recovery of the molybdic acid constituents in the filtrate from filter A. For example, anion solvent extraction or ion exchange resin systems can be employed for extracting the dissolved molybdate anions from the filtrate following the hot water leach treatment. Such an alternate arrangement is illustrated in the flow diagram depicted in FIG. 2 of the drawings in which the filtrate from filter 1 is passed through an anion exchange resin to extract the dissolved molybdate anions therein. Anion exchange resins that can be satisfactorily employed include tertiary amine in styrene divinyl benzene matrices, such as available under the designation IRA-93 from Rohm & Haas; type XE 270 and XE 299 resins which are also tertiary amine type resins available from Rohm & Haas; epichlorhydrine-polyamine condensation-type (aliphatic polyamine types) available in a granular state under the designation A-305 from Ionic Chemical Co., as well as equivalent types which are effective to selectively adsorb the molybdate anion in a substantially neutral medium.

When employing such anion exchange resins, it is necessary that the filtrate first be neutralized by the addition of a suitable base, such as sodium hydroxide, to a pH of about 3.0 to about 6.5 before entering the anion exchange column. The filtrate containing the contaminating metal cations passes through the anion exchange column and the effluent or raffinate, after appropriate treatment, is harmlessly discharged to waste. After loading with molybdate anions, the resin in conveniently eluted employing an aqueous solution of ammonium hydroxide and the resultant eluate containing ammonium molybdate is transferred in accordance with the arrangement shown in FIG. 2 to the evaporator in admixture with the filtrate from filter 2.

It is also contemplated that in lieu of employing ion exchange principles, the filtrate such as derived from filter A of FIG. 1 or filter 1 of FIG. 2 can be transferred to a neutralizing tank to which an alkaline calcium compound is added for reaction with the dissolved molybdate anions as well as some of the metal cation species with the exception of potassium, forming thereby precipitates which are recovered by filtration, providing a cake consisting predominantly of calcium molybdate. The calcium molybdate containing cake may suitably be recycled for admixture with the original concentrate introduced to the air roasting operation or can be further utilized in alternative processes for producing molybdenum containing compounds.

In either event, the filter cake from filter A, as shown in FIG. 1, is subjected to an ammoniacal leach treatment in which the cake is again pulped at a concentration ranging from about 5 up to about 50% solids by weight, and preferably from about 20 to about 50% solids in an aqueous solution containing from about 10 up to about 29% ammonia and at a temperature ranging from about 20° to about 30° C. A retention time ranging from about two to about five hours, and preferably from about three hours to about four hours, is effective to extract substantially all of the molybdenum trioxide constituents in the filter cake and oxidize and precipitate all the iron as ferric hydroxide. The resultant slurry is thereafter transferred to filter B in which the residual aqueous and ammoniacal insoluble constituents comprising predominantly gangue minerals and $Fe(OH)_3$ are removed and the cake discarded to waste.

The filtrate from filter B is transferred to a concentrator, such as an evaporative crystallizer as shown in FIG. 1, in which it is heated to effect a removal of water accompanied by an evolution of ammonia so as to effect a concentration of the ammonium molybdate compounds therein to a concentration approaching saturation. A heating of the ammoniacal leach solution in the evaporative crystallizer is performed at a temperature ranging from about 90° to above 98° C and may be carried out to an extent wherein all or a controlled lesser amount of the dissolved ammonium molybdate compounds precipitate out in the form of ammonium dimolybdate or ADM, $[(NH_4)_2Mo_2O_7]$, which are extracted from the remaining mother liquor and are recovered as a solid crystalline ADM product. Conventionally, at least a portion of the mother liquor from the evaporative crystallizer is bled to a pH adjustment tank maintained at a temperature ranging from about 30° to about 77° C and preferably at about 55° C and the pH of the ammoniacal solution bleed is adjusted by the addition of an acidic agent, preferably carbon dioxide. The quantity of acid added to the pH adjustment tank is controlled so as to effect a neutralization thereof and a net pH within the range of from about 6.3 to about 7.0 corresponding to an adjustment of the mol ratio of ammonia to molybdenum trioxide within a range of about 0.86:1 to about 1.25:1. For this purpose, acidic substances that can be satisfactorily employed include $H_2SO_4$, HCL, $HNO_3$, and carbon dioxide, of which carbon dioxide constitutes the preferred material. After pH adjustment, the adjusted solution maintained at a temperature of about 30° to about 77° C, preferably about 55° C, is transferred to a cooling crystallizer in which it is progressively cooled to a temperature of about 20° C or below. In situations wherein the mother liquor withdrawn from the evaporative crystallizer is at a pH of about 7.0 or below, no further pH adjustment is required and the mother liquor can be directly transferred to the cooling crystallizer as indicated by the dotted lines in FIG. 1.

Under conditions wherein the mol ratio of ammonia to molybdenum trioxide is about 1.25:1 and the solution is substantially saturated and at a temperature of 55° C, a cooling thereof in the cooling crystallizer to a temperature of about 20° C or below effects a precipitation of up to about 40% of the molybdenum content therein in the form of ammonium heptamolybdate crystals.

At the conclusion of the cooling cycle, the AHM crystals are removed from the mother liquor such as by filtration or centrifugation, and the residual ammonium molybdate solution is recycled back to the evaporative crystallizer in accordance with the arrangement illustrated in FIG. 1 of the drawings. The recycled solution is again reheated and concentrated in the evaporative crystallizer whereby the carbon dioxide constituent therein is vaporized, the water is recycled to the hot aqueous leach tank, while the volatilized ammonia is returned to the ammoniacal leaching tank.

In accordance with one practice of the present invention, the evaporative crystallizer can operate on a substantially continuous basis producing a crystalline ADM product while the cooling crystallizer can operate on an intermittent basis by the extraction of controlled bleed quantities of the saturated solution from the evaporative crystallizer for adjustment and subsequent crystallization to recover a high purity AHM product.

The process depicted in FIG. 2 of the drawings is similar to that hereinabove described in connection with FIG. 1 but as previously mentioned, the filtrate from filter 1 is transferred through an anion exchange column to effect an extraction of the dissolved molybdate anions which are subsequently recovered by elution and the resultant eluate containing ammonium molybdate is transferred to the ammoniacal leaching step or preferably directly to the vacuum evaporator. The hot water leaching step and the ammoniacal leaching step, including the intervening filtration steps, are performed in the same manner employing the same conditions as previously described in connection with FIG. 1.

Following filtration in filter 2, the filtrate is concentrated in a vacuum evaporator, whereby appropriate proportions of ammonia and water are extracted by evaporation and are subsequently recovered in a condenser and transferred to a surge tank for recirculation back to the ammoniacal leaching tank. The vacuum evaporator is operated in a controlled manner, whereby the mol ratio of ammonia to molybdenum trioxide is adjusted to within a range of about 0.86:1 to about 1.25:1, and the concentration of dissolved AHM is increased within a range of about 300 up to about 500 grams per liter approaching saturation of AHM in the aqueous solution at about 55° C. The concentrated solution thereafter is directly transferred to a cooling crystallizer without any need for a pH adjustment, whereupon a progressive cooling to a temperature of about 20° C or below effects a precipitation of upwards of about 40% of the ammonium molybdate content in the solution in a manner as previously described. The crystals of AHM are extracted employing a filter or centrifuge, and the resultant crystalline cake is dried at a temperature of less than 55° C to avoid decomposition of AHM such as by employing a vacuum dryer producing a high purity crystalline ammonium heptamolybdate product. The filtrate from the filter or centrifuge is conveniently recirculated to the surge tank is returned to the ammoniacal leaching tank in accordance with the flow diagram shown in FIG. 2.

In order to further illustrate the process comprising the present invention, the following examples are provided. It will be understood that the examples are provided for illustrative purposes and are not intended to be limiting of the scope of the present invention as herein described and as set forth in the subjoined claims.

EXAMPLE 1

A 150-gram sample of a reroasted molybdic oxide concentrate feed material containing 90-98% molybdenum trioxide is subjected to a hot aqueous leaching step employing 150 ml of deionized water at 85° C for a period of 1 hour. The resultant leached concentrate is filtered and the cake is washed with hot deionized water. The washed filter cake is mixed with 250 ml of deionized water and 250 ml of a 29% solution of ammonia forming a slurry at room temperature containing 16-18% molybdenum trioxide having a pH of 9.5. The ammoniacal leaching step is carried out for a period of four hours, whereafter the resultant slurry is filtered and the filtrate containing the dissolved ammonium molybdate compounds is saturated with carbon dioxide gas at 55° C corresponding to a use of 0.05 to 0.1 pounds of carbon dioxide for each pound of molybdenum trioxide. The carbon dioxide treated filtrate is thereafter placed in a cooling crystallizer and cooled to a temperature below 20° C. A yield of AHM crystals is recovered corresponding to approximately 45% of the molybdenum content originally present in the feed material.

EXAMPLE 2

A 150-gram sample of a reroasted molybdic oxide concentrated feed material containing from 90-98% molybdic oxide is leached for a period of one hour with 150 ml of deionized water at a temperature of 85° C in the form of a slurry of 50% solid content. The hot water leached molybdenum trioxide feed material is thereafter filtered and washed with hot deionized water. The washed filter cake is mixed with 250 ml of deionized water and 250 ml of a 29% ammonia solution and the ammoniacal leaching step is carried out for a period of four hours at room temperature. The slurry has a pH of 9.5. At the conclusion of the ammoniacal leaching step, the slurry is filtered and the filtrate containing 200-250 grams per liter of molybdenum is concentrated by distillation under a vacuum of 20 inches mercury at a temperature not exceeding 75° C. The concentration is continued until the first crystals of AHM appear in the solution. The condensate from the distillation is recovered and is of a pH ranging from 10-11 and contains from 60-62% of the water in the original ammoniacal leaching step filtrate. Upon reaching this point of concentration, the vacuum is removed and the concentrated filtrate is immediately cooled to 20° C and held at that temperature for 1 hour while being subjected to occasional stirring. The high purity crystals of AHM produced during the cooling crystallization step are extracted by filtration and dried at room temperature under vacuum. A total of 40-45% of the molybdenum present in the original molybdic oxide feed material is recovered in the form of an AHM product. The resultant filtrate from the AHM crystals has a pH of 7.8-7.9 and contains 280-285 grams per liter of molybdenum. The AHM filtrate is subjected to further concentration under vacuum in accordance with aforementioned procedure and additional crystals of AHM are recovered. Alternatively, the AHM filtrate and the condensate from the evaporative concentrator are recycled to the ammonium hydroxide leaching step for use in leaching additional aqueous leached molybdic oxide concentrate feed material.

EXAMPLE 3

A 150-gram sample of a reroasted molybdic oxide feed material containing 90-98% molybdenum oxide is leached with 150 ml of deionized water to form a slurry having a 50% solids content. The hot aqueous leaching step is carried out at 85° C for a period of 1 hour. The hot aqueous leached feed material is recovered by filtration and is washed with hot deionized water. The resultant washed filter cake is mixed with 250 ml of deionized water and 250 ml of a 29% solution of ammonia to effect an ammoniacal leaching at room temperature for a period of 4 hours. The slurry contains 16-18% molybdenum oxide and is of a pH of 9.5. The resultant slurry is filtered and the filtrate containing ammonium molybdate compounds dissolved therein is evaporated at 98° C to a concentration at which the first crystal formation appears. The resultant liquor is cooled to 20° C in a cooling crystallizer, whereupon the bulk of the AHM crystals are formed and recovered.

While it will be apparent that the invention herein described is well calculated to achieve the advantages and benefits set forth above, it will be appreciated that the invention is susceptible to modification, variation and change without departing from the spirit thereof.

What is claimed is:

1. A process for producing an ammonium molybdate product which comprises the steps of leaching a particulated impure molybdenum oxide concentrate comprised predominantly of molybdenum trioxide with water at a temperature of from about 70° to about 95° C at a solids concentration of from about 5 to about 50% for a period of time sufficient to extract at least a portion of the aqueous soluble contaminating metal cations present in said feed material, extracting the water leached said concentrate from the water leach solution, recovering the molybdate values dissolved in said water leach solution, leaching the water leached said concentrate with an ammoniacal leach solution to solubilize and extract the molybdenum trioxide constituent therein as ammonium molybdate compounds, separating said ammoniacal leach solution from the remaining insoluble residue, transferring the separated said ammoniacal leach solution to a concentrator and heating and concentrating said ammoniacal leach solution to a point up to saturation of the dissolved said ammonium molybdate compounds therein, withdrawing at least a portion of the concentrated said leach solution and adjusting the $NH_3:MoO_3$ mol ratio thereof to within a range of about 0.86:1 to about 1.25:1, cooling the adjusted said leach solution to effect a precipitation of ammonium heptamolybdate crystals, separating and recovering said crystals from the cooled said leach solution, and recycling the cooled said leach solution for admixture with additional said separated said ammoniacal leach solution for concentration in said concentrator.

2. The process as defined in claim 1 in which the step of recovering the molybdate values in said water leach solution is performed by contacting the separated said water leach solution with a cation exchange resin to adsorb the solubilized contaminating cations therein and recycling the balance of said water leach solution in admixture with the molybdenum oxide concentrate and ammoniacal leach solution in the ammoniacal leaching step.

3. The process as defined in claim 1 in which the step of recovering the molybdate values in said water leach solution is performed by contacting the separated said water leach solution with anion exchange resin to adsorb the solubilized molybdate anions therein, discarding the balance of said water leach solution, and eluting the adsorbed said molybdate anions with ammonia to form ammonium molybdate compounds and recovering said eluted ammonium molybdate compounds.

4. The process as defined in claim 3 in which said eluted ammonium molybdate compounds are recycled to said concentrator.

5. The process as defined in claim 1 wherein the adjustment of the mol ratio of $NH_3:MoO_3$ is performed by neutralizing the concentrated said leach solution with acid to provide a pH within the range of about 6.3 to about 7.0.

6. The process as defined in claim 5 wherein the neutralization of the concentrated said leach solution is achieved by the addition of carbon dioxide to said leach solution.

7. The process as defined in claim 1 in which the step of cooling the adjusted said leach solution is performed to produce a temperature of from about 20° to about 10° C.

8. The process as defined in claim 1 wherein said concentrator comprises an evaporative crystallizer and the step of concentrating said ammoniacal leach solution is performed to effect crystallization of at least some of the ammonium molybdate compounds therein as ammonium dimolybdate crystals in said evaporative crystallizer, and including the further step of separating said ammonium dimolybdate crystals from the mother liquor, withdrawing at least a portion of the mother liquor from said evaporative crystallizer, adjusting the ammonia to molybdenum oxide mol ratio thereof and cooling the adjusted mother liquor to effect precipitation of said ammonium heptamolybdate crystals.

9. The process as defined in claim 1 including the further step of drying said ammonium heptamolybdate crystals under vacuum at a temperature below about 55° C.

* * * * *